US011472929B2

(12) United States Patent
Ma et al.

(10) Patent No.: US 11,472,929 B2
(45) Date of Patent: Oct. 18, 2022

(54) NYLON POWDER COMPOSITION FOR 3D PRINTING, AND PREPARATION METHOD AND APPLICATION THEREOF

(71) Applicant: INSTITUTE OF CHEMISTRY, CHINESE ACADEMY OF SCIENCES, Beijing (CN)

(72) Inventors: Yongmei Ma, Beijing (CN); Kun Zheng, Beijing (CN); Jingnan Zhang, Beijing (CN); Xinyu Cao, Beijing (CN); Fusong Wang, Beijing (CN); Xuechun Lin, Beijing (CN); Wenhua Sun, Beijing (CN); Jian Xu, Beijing (CN); Jinyong Dong, Beijing (CN); Chuncheng Li, Beijing (CN); Wenxin Fu, Beijing (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 1436 days.

(21) Appl. No.: 15/507,662

(22) PCT Filed: Apr. 24, 2015

(86) PCT No.: PCT/CN2015/077350
§ 371 (c)(1),
(2) Date: Feb. 28, 2017

(87) PCT Pub. No.: WO2015/165361
PCT Pub. Date: Nov. 5, 2015

(65) Prior Publication Data
US 2017/0253702 A1 Sep. 7, 2017

(30) Foreign Application Priority Data

Apr. 30, 2014 (CN) .......................... 201410181476.X
Apr. 30, 2014 (CN) .......................... 201410181731.0
Apr. 30, 2014 (CN) .......................... 201410181764.5
Apr. 30, 2014 (CN) .......................... 201410182347.2
Apr. 30, 2014 (CN) .......................... 201410183470.6

(51) Int. Cl.
*C08J 3/12* (2006.01)
*C08G 69/46* (2006.01)
*C08G 69/26* (2006.01)
*C08G 69/14* (2006.01)
*C08L 77/02* (2006.01)
*C08L 77/06* (2006.01)
*B29C 67/00* (2017.01)
*C08J 3/215* (2006.01)
*C08K 5/00* (2006.01)
*B29C 64/153* (2017.01)
*B29C 64/20* (2017.01)
(Continued)

(52) U.S. Cl.
CPC .............. *C08J 3/12* (2013.01); *B29C 64/153* (2017.08); *B29C 64/20* (2017.08); *B29C 67/00* (2013.01); *B33Y 10/00* (2014.12); *B33Y 70/00* (2014.12); *B33Y 80/00* (2014.12); *C08G 69/14* (2013.01); *C08G 69/26* (2013.01); *C08G 69/46* (2013.01); *C08J 3/203* (2013.01); *C08J 3/215* (2013.01); *C08K 3/013* (2018.01); *C08K 3/04* (2013.01); *C08K 3/08* (2013.01); *C08K 3/34* (2013.01); *C08K 5/005* (2013.01); *C08L 77/02* (2013.01); *C08L 77/06* (2013.01); *B29K 2105/0002* (2013.01); *B29K 2105/251* (2013.01); *C08J 2377/02* (2013.01); *C08J 2377/06* (2013.01); *C08K 3/36* (2013.01); *C08K 2201/005* (2013.01); *C08K 2201/01* (2013.01)

(58) Field of Classification Search
CPC ..... C08J 3/12; C08J 3/20; C08J 3/203; B33Y 10/00; B33Y 70/00; B33Y 80/00; B29K 2105/251; C08K 3/04; C08K 3/08; C08K 3/34
See application file for complete search history.

(56) References Cited

U.S. PATENT DOCUMENTS 5,597,888 A * 1/1997 Nielinger ............... C08G 69/16
528/331
5,710,216 A * 1/1998 Weber .................... C08L 77/06
525/190
(Continued)

FOREIGN PATENT DOCUMENTS

CN 101899208 A 12/2010
CN 102477219 A 5/2012
(Continued)

Primary Examiner — Jane L Stanley
(74) Attorney, Agent, or Firm — Novick, Kim & Lee, PLLC; Allen Xue

(57) ABSTRACT

This invention relates to a high molecular weight nylon powder composition for 3D printing, its preparation method and use. The composition comprises: 100 parts by weight of high-viscosity nylon powder, 1-5 parts by weight of a flow agent, and 0.1-1 parts by weight of an antioxidant; the high-viscosity nylon powder is one or more selected from nylon 6, nylon 66, nylon 11, nylon 12, nylon 612 and nylon 610; or the powder composition is obtained via polymerization reaction of the raw materials comprising the following components, based on the weight parts of lactam monomers or amide monomers: 100 parts by weight of lactam monomers or amide monomers, 0.005-1 parts by weight of a catalyst, and 0.1-1 parts by weight of an antioxidant. The high molecular weight nylon powder composition prepared in the present invention has a particle diameter in the range of 20-100 micrometers, good powder spreading performance, and is suitable for the 3D printing process, and the product of the high molecular weight nylon powder composition has good mechanical properties, good dimensional stability and low manufacturing cost.

5 Claims, No Drawings

(51) Int. Cl.
  *C08K 3/013* (2018.01)
  *B33Y 10/00* (2015.01)
  *B33Y 70/00* (2020.01)
  *B33Y 80/00* (2015.01)
  *C08J 3/20* (2006.01)
  *C08K 3/04* (2006.01)
  *C08K 3/08* (2006.01)
  *C08K 3/34* (2006.01)
  *C08K 3/36* (2006.01)
  *B29K 105/00* (2006.01)

(56) References Cited

U.S. PATENT DOCUMENTS

| | | | | |
|---|---|---|---|---|
| 9,611,355 B2* | 4/2017 | Marfinoni | | C08J 3/12 |
| 11,091,605 B2* | 8/2021 | Hewel | | C08L 77/06 |
| 2006/0100335 A1* | 5/2006 | Yalvac | | C08L 23/0815 |
| | | | | 524/436 |
| 2010/0237271 A1* | 9/2010 | Stoppelmann | | C08L 77/06 |
| | | | | 524/80 |
| 2014/0048738 A1* | 2/2014 | Xia | | C08K 3/00 |
| | | | | 252/62.54 |
| 2020/0398484 A1* | 12/2020 | Tandy | | B29C 64/188 |
| 2022/0134648 A1* | 5/2022 | Woodruff | | C08L 77/06 |
| | | | | 264/494 |

FOREIGN PATENT DOCUMENTS

| | | |
|---|---|---|
| CN | 102492134 A | 6/2012 |
| CN | 102964590 A | 3/2013 |
| CN | 103013102 A | 4/2013 |
| CN | 103205107 A | 7/2013 |
| JP | H01272436 A | 10/1989 |
| WO | 2001064791 A1 | 9/2001 |

* cited by examiner

NYLON POWDER COMPOSITION FOR 3D PRINTING, AND PREPARATION METHOD AND APPLICATION THEREOF

TECHNICAL FIELD

The present invention relates to a high molecular weight nylon (PA) powder, its preparation method and application, specifically relates to a high molecular weight nylon powder which can be used for 3D printing, its preparation method and application.

BACKGROUND ART 3D printing technology, also known as additive manufacturing technology, is a new technology in the field of speedy prototyping, which is based on digital model files, using adhesive materials such as powder metal or plastic, by the layered printing method constructing objects. The basic principle of the technology is based on a stacking of physical layers, whereby layer upon layer of the materials is built up to generate a three-dimensional entity. Currently, 3D printing technology has been mainly used in the fields such as product prototyping, mold manufacturing, artistic creation, and jewelry making and so on, in order to replace the processes in these fields that previously relied on the traditional fine processing technology. In addition, the 3D printing technology is gradually being introduced in the fields such as medicine, bioengineering, architecture, clothing, aviation and so on, providing great freedom in the innovation development.

3D printing technology mainly includes SLA, FDM, SLS, LOM and other processes. Among them, in both of fused deposition modeling (FDM) and selective laser sintering (SLS) techniques the thermoplastics materials are used as the basic 3D printing materials.

Generally, SLS technique and equipment use a laser as the power source that focuses on a target area. In the target area, where the part is produced, a powdered material partially melts or softens under the energy emitted from the laser. In the operation, the laser energy to which the powder is exposed is just sufficient to quickly form the part slice, and therefore prior to the laser irradiation it is necessary to heat the target area, so that the powder is preheated to just below its melting point, and by a leveling roller the powder is spread to be a smooth surface; the laser beam is controlled by a computer and scans a selected portion of the target area according to the layered cross-section information. After a layer is completed, the next layer is sintered, and after all layers are sintered, the excess powder is removed. Thus a sintered part is obtained.

Specifically, SLS equipment includes a facility to deposit a smooth, leveled layer of the powder material onto the target surface before the layer of powder is exposed to the laser energy. The laser energy emission is controlled and limited to a selected portion of the target area by a computer link to a CAD/CAM system which directs the laser to scan, and a "slice" of the part is formed. After exposure of powder material to form the first "slice" of the part, a second layer of powder material is deposited into the target area. Again the laser scans the target area by exposing only the portion of the target area as directed by the CAD/CAM program to produce a second "slice" of the part. This process is repeated until the part is built up "slice by slice" to form the completed part.

The various properties of the sinterable powder are critical to ensure a processing window is available in the selective laser sintering process. That means, at certain elevated temperature the polymer particle softening is reduced to a minimum level, the powder can be stored in the heated target environment without the initiation of the particle fusing, until later the energy by the scanning laser beam is rapidly concentrated and transferred to the heated particles.

Since the SLS molding method has the characteristics such as simple manufacturing process, high flexibility, wide selection of material, cheap materials, low cost, high material utilization and fast forming, the SLS method is mainly used in the casting industry and can be used to directly produce fast molds.

The development of suitable raw materials for the above-described 3D printing technology has become the focus of current research in many countries.

At present, the most commonly used polymer materials on the market are acrylonitrile-butadiene-styrene (ABS) copolymer, polylactic acid (PLA), nylon (PA) and polycarbonate (PC), wherein nylon is the most widely used printing raw materials. Among nylon materials, only nylon 12 is currently the major material for 3D printing, mainly because nylon 12 has the lowest melting temperature, less water absorption and molding shrinkage, which is the most suitable material for powder sintering, but the cost is high. In addition, when the pure nylon powder material is used for the 3D printing process, the prepared products do not have good dimensional stability and heat resistance.

Therefore, the development of low-cost, high-performance nylon powder materials has great importance.

CONTENTS OF THE INVENTION

To overcome the shortcomings of less varieties and poorer performance of nylon powder materials for 3D printing, the present invention has proposed a novel high molecular weight nylon powder material suitable for 3D printing, its preparation method and use.

An object of the present invention is to provide a high molecular weight nylon powder for 3D printing, said powder materials have one or more advantages: high viscosity (i.e. high molecular weight), the prepared 3D products having good mechanical strength, toughness and dimensional stability; having thermal conductivity, the prepared 3D products having good dimensional stability and thermal conductivity.

The second object of the present invention is to use moderately low molecular weight nylon powder via solid state polycondensation to produce high-viscosity (i.e. high molecular weight) nylon powder, thus providing a method for preparing high-viscosity nylon powder which can be used for 3D printing.

The third object of the present invention is to use lactam monomers via anionic polymerization to produce high molecular weight nylon powder, thereby providing a method for producing thermally conductive high molecular weight nylon powder which can be used for 3D printing.

The fourth object of the present invention is to use amide and graphite via in-situ polymerization to produce thermally conductive high molecular weight nylon powder, thereby providing a method for producing thermally conductive high-viscosity nylon powder which can be used for 3D printing.

The fifth object of the present invention is to use amide via slurry polymerization to produce high-viscosity nylon powder, thereby providing a method for producing high-viscosity nylon powder which can be used for 3D printing.

The sixth object of the present invention is to provide the use of the above-mentioned high molecular weight nylon powder for 3D printing and the prepared 3D printing products.

This invention can be realized by the following technical solutions:

A high molecular weight nylon powder composition for 3D printing, wherein said composition comprises:

| high-viscosity nylon powder | 100 parts by weight |
|---|---|
| flow agent | 1-5 parts by weight |
| antioxidant | 0.1-1 parts by weight | said high-viscosity nylon powder is one or more selected from nylon 6, nylon 66, nylon 11, nylon 12, nylon 612 and nylon 610;

Or, said powder composition is obtained via polymerization reaction of the raw materials comprising the following components, based on the weight parts of lactam monomers or amide monomers, wherein:

| lactam monomer or amide monomer | 100 parts by weight |
|---|---|
| catalyst, | 0.005-1 parts by weight |
| antioxidant | 0.1-1 parts by weight |

When said monomer is amide monomer, said raw materials also include:

| molecular weight control agent | 5-30 parts by weight |
|---|---|
| molecular chain stabilizer | 0.01-1 parts by weight. |

According to the present invention, said raw materials also include:

| graphite | 1-50 parts by weight. |
|---|---|

According to the present invention, when said monomer is lactam, said raw materials also include:

| activator | 0.01-2 parts by weight. |
|---|---|

According to the present invention, when said monomer is lactam, said catalyst is an alkaline catalyst.

According to the present invention, when said monomer is amide monomer, the added amount of said catalyst used is 0.02-0.8 parts by weight.

The present invention also provides a method for preparing the high molecular weight nylon powder for 3D printing, wherein said method comprises the following steps of:

(1) after homogeneously mixing 100 parts by weight of moderately low-viscosity nylon powder and 30-300 parts by weight of inorganic solid particles, adding the mixture into a reactor together;

(2) purging the reactor with $N_2$ gas; uniformly raising the reactor temperature up to 180-250° C. in 90-120 minutes, and keeping the temperature constant for 0.5-10 hours;

(3) opening the discharge valve of the reactor to discharge into a container, cooling to a temperature of 25° C., and then separating nylon powder through a separator, i.e. giving high-viscosity nylon powder with a relative viscosity of 4-20.

The present invention also provides a method for preparing the high molecular weight nylon powder composition for 3D printing, wherein said method comprises the following steps of: after homogeneously mixing 100 parts by weight of the high-viscosity nylon powder with a relative viscosity of 4-20, 1-5 parts by weight of a flow agent and 0.1-1 parts by weight of an antioxidant, i.e. giving a nylon powder composition of the present invention.

The present invention also provides a method for preparing the high molecular weight nylon powder composition for 3D printing, wherein said method comprises the following steps of:

(1) based on the weight parts of lactam monomers, adding 100 parts by weight of lactam monomers into a container, and then dehydrating under vacuum;

(2) adding 0.005-1 parts by weight of an alkaline catalyst, and 0.1-1 parts by weight of an antioxidant, continuing to vacuum, raising the temperature up to 130-140° C., and keeping the reaction temperature constant for 10-30 minutes;

(3) then, adding 0.1-2 parts by weight of an activator, stirring until mixing homogeneously, pouring into a container containing solid particles preheated to 150-170° C., after vigorously stirring and keeping the temperature constant for a while, cooling to room temperature;

(4) by a separation method, obtaining a nylon powder composition with molecular weights in the range of 0.05-1.2 million and the particle sizes in the range of 20-100 micrometers.

In the step (1) in the above-described method, 1-50 parts by weight of graphite are added simultaneously into the container.

The present invention also provides a method for preparing the high molecular weight nylon powder composition for 3D printing, wherein said method comprises the following steps of:

(1) adding 100-600 parts by weight of a high temperature inert solvent into a reactor, during stirring, adding 100 parts by weight of amide and 5-30 parts by weight of a molecular weight control agent, stirring until mixing homogeneously, adding 0.01-1 parts by weight of a molecular chain stabilizer, 0.02-0.8 parts by weight of a catalyst and 0.1-1 part by weight of an antioxidant, stirring until mixing homogeneously;

(2) raising the reactor temperature in at least two steps, firstly uniformly raising the temperature from room temperature to 180-220° C. within a period of time, while maintaining the reactor pressure between 1.5-2 MPa; after that, heating the reactor, raising the temperature from 180-220° C. to 280-285° C. within a period of time, and reducing the reactor pressure to 1.01 MPa; after keeping the temperature between 270-285° C. for 30-60 minutes, vacuuming, reducing the reactor pressure to 0.3 Pa, and maintaining the pressure for 1-4 hours;

(3) opening the discharge valve of the reactor to discharge into the container, vigorously stirring for 10-100 minutes, centrifugally separating, drying, obtaining a nylon powder composition with a relative viscosity of 4-20 and the particle sizes in the range of 20-100 micrometers.

In the step (1) in the above-mentioned method, 1-50 parts by weight of graphite is added simultaneously with the amide.

The present invention also provides the use of the nylon powder composition, wherein said nylon powder composition is used for 3D printing technology, in which said nylon powder composition is as described above.

The present invention also provides a method of 3D printing, wherein the high molecular weight nylon powder composition is used for the printing material.

According to the present invention, said printing method comprises the steps of:

(1) depositing the high molecular weight nylon powder composition of the present invention onto a carrier surface, and covering a target region;

(2) flatting said nylon powder composition to form a smooth surface;

(3) directing an energy beam over the target region causing said powder to form an integral layer; and (4) repeating the steps (1) to (3) to form additional layers that are integrally bonded to adjacent layers so as to form a three-dimensional product.

The present invention also provides a three-dimensional product, wherein said three-dimensional product includes said high molecular weight nylon powder composition in the application.

The advantageous effects of the present invention are:

The composition of the present invention contains high-viscosity (i.e. high molecular weight) nylon powder, which possesses good flowability, good flattening effect in the 3D printing process, resulting in a 3D printing product with higher precision; the 3D printing product with high-viscosity nylon powder has better mechanical strength than that with the low molecular weight nylon. The nylon powder is suitable for the 3D printing process, and the overall performance of the product is better than that prepared with common nylon powder.

The thermally conductive high molecular weight nylon powder of the present invention is obtained via in-situ polymerization of lactam monomers on graphite surface in the presence of hot particles, which is used for 3D printing, possessing workability, thermal stability, high thermal conductivity, and the prepared product has better mechanical properties and thermal conductivity.

The high molecular weight nylon powder of the present invention is obtained via anionic polymerization of lactam monomers in the presence of an alkaline catalyst and an activator in the dispersion of solid particles. In comparison to the slurry polymerization method, the powder particles prepared by this method have less impurity on the surface, controllable particle sizes, high molecular weights, which are used for 3D printing, and the prepared product has better mechanical properties and dimensional stability.

The present invention utilizes the principle of in-situ polymerization to produce a high molecular weight nylon powder composite material in a high boiling point solvent via in-situ polymerization of graphite, amide, etc. Because it is the in-situ polymerization reaction, graphite is homogeneously dispersed in the nylon matrix. Due to the stronger interfacial interaction between the graphite and the nylon matrix, it is favorable for heat transfer at the interface to reduce the interfacial thermal resistance, and at the same time stress transfer at the interface is utilized, therefore the thermal conductivity of the thermally conductive nylon powder composition is obviously improved. And the strong interface interaction also significantly improves the mechanical properties and thermal stability of the thermally conductive nylon composite material. The thermally conductive nylon powder of the present invention has a relatively viscosity of 4-20, and the particle sizes are adjustable in the range of 20-100 micrometers. The products of the present invention can be used for 3D printing, having good dimensional stability and high thermal conductivity, which can meet the requirements for high-performance and thermally conductive composite materials with complex structures in the fields of thermal energy utilization, chemical heat exchange, and so on.

The high molecular weight nylon powder of the present invention is prepared by the slurry polymerization method, via condensation of amide in a high boiling point solvent. The nylon powder of the present invention has an adjustable relative viscosity in the range of 4-20, and the particle sizes are controllable in the range of 20-100 micrometers. It possesses characteristics, such as high viscosity and controllable powder particle sizes. Compared to the traditional methods of cryogenic grinding of nylon chips and solvent precipitation, the method is simpler and lower energy consumption. The production process is simple, and the prepared powder meets the requirements of 3D printing products.

EXAMPLES

In one example of the present invention, it provides a high-viscosity nylon powder, its preparation method and use. During the preparation, the principle of solid state polycondensation is used. Under certain conditions, the relatively low molecular weight nylon powder is polymerized again to obtain relatively high-viscosity nylon powder. The powder prepared by the method can be well used in secondary molding. The nylon powder prepared by the method has characteristics, such as high molecular weight and high viscosity, which is suitable for the 3D printing process.

As described above, the present invention provides a high molecular weight nylon powder composition for 3D printing, wherein said composition comprises:

| high-viscosity nylon powder | 100 parts by weight |
| flow agent | 1-5 parts by weight |
| antioxidant | 0.1-1 parts by weight |

Said high-viscosity nylon powder is one or more selected from nylon 6, nylon 66, nylon 11, nylon 12, nylon 612 and nylon 610.

The particle sizes of said high-viscosity nylon powder are in the range of 20-100 micrometers, preferably 30-90 micrometers, or 40-80 micrometers, and also can be 50-70 micrometers.

The relative viscosity of said high-viscosity nylon powder is in the range of 4-20, preferably 5-18, more preferably 6-15, and also can be 8-10.

Said high-viscosity nylon powder is made of moderately low-viscosity nylon powder. Viscosity of said moderately low-viscosity nylon powder is in the range of 2-5, preferably 3-4.

Said high-viscosity nylon powder is prepared by the following method:

(1) after homogeneously mixing 100 parts by weight of moderately low-viscosity nylon powder and 30-300 parts by weight of inorganic solid particles, adding the mixture into a reactor together;

(2) purging the reactor with $N_2$ gas; uniformly raising the reactor temperature up to 180-250° C. in 90-120 minutes, and keeping the temperature constant for 0.5-10 hours;

(3) opening the discharge valve of the reactor to discharge into a container, cooling to a temperature of 25° C., and then separating nylon powder through a separator, i.e. giving high-viscosity nylon powder with a relative viscosity of 4-20.

In the above-described method, the inorganic solid particles are useful for an increase of molecular weights of the nylon powder, in which mutual bonding does not occur. Meanwhile, in the separating step (3), the inorganic solid particles can be sorted out, and the particle recycling can also be realized.

The particle sizes of said inorganic solid particles are in the range of 1-50 micrometers.

Said inorganic solid particles are selected from magnetic powder such as iron, nickel, cobalt, and so on, or one or more selected from quartz sand, silica particles and manufactured sand.

Said flow agent is an inorganic powdered substance having the particle sizes in the range of 10-100 nm, preferably selected from the group consisting of hydrated silicas, amorphous alumina, glassy silicas, glassy phosphates, glassy borates, titanium dioxides, talc, mica, fumed silicas, kaolin, attapulgite, calcium silicates, magnesium silicates or silica; preferably talc, mica or silica. The presence of the flow agent facilitates the powder to flow and level to be smoother during the 3D printing process.

Preferably, the added amount of said flow agent is 2-4 parts by weight.

Said antioxidant is one or more selected from the group consisting of antioxidant 1010: pentaerythritol-tetra-[β-(3,5-di-tert-butyl-4-hydroxyphenyl)-propionate]; antioxidant 1096: IRGANOX B-1096; antioxidant 1098: 3,3'-bis(3,5-di-tert-butyl-4-hydroxyphenyl)-N,N-hexamethylenedipropionamide in combination with phosphate antioxidant; antioxidant 168: tris (2,4-di-tert-butylphenyl) phosphite. The antioxidant can prevent decomposition of nylon during the 3D printing process at a high temperature. Preferably, the added amount of the antioxidant is 0.2-0.8 parts by weight, and also can be 0.3-0.7 parts by weight.

Preferably, the added amount of said flow agent is 2-4 parts by weight.

Preferably, the added amount of the antioxidant is 0.2-0.8 parts by weight, and also can be 0.3-0.7 parts by weight.

Preferably, said high-viscosity nylon powder is prepared by the above-described method of the present invention.

More preferably, the preparation method of the high-viscosity nylon powder composition of the present invention comprises the following steps of:

(1) after homogeneously mixing 100 parts by weight of moderately low-viscosity nylon powder and 30-300 parts by weight of inorganic solid particles, adding the mixture into a reactor together;

(2) purging the reactor with $N_2$ gas; uniformly raising the reactor temperature up to 180-250° C. in 90-120 minutes, and keeping the temperature constant for 0.5-10 hours;

(3) opening the discharge valve of the reactor to discharge into the container, cooling to room temperature, separating nylon powder through a separator, i.e. obtaining a high-viscosity nylon powder with relative viscosity of 4-20.

(4) then adding 1-5 parts by weight of a flow agent and 0.1-1 parts by weight of an antioxidant, mixing homogeneously, i.e. obtaining a nylon powder composition of the invention.

Preferably, said method comprises the following steps of:

(1) after homogeneously mixing 100 parts by weight of moderately low-viscosity nylon powder and 30-300 parts by weight of inorganic solid particles, adding the mixture into a reactor together, purging the reactor with $N_2$ gas and discharging air in the reactor by vacuuming;

(2) purging the reactor with $N_2$ gas; uniformly raising the reactor temperature (e.g. 25-30° C.) up to 180-250° C. in 90-120 minutes, and keeping the temperature constant for 0.5-10 hours;

(3) opening the discharge valve of the reactor to discharge into the container, cooling to room temperature (e.g. 25-30° C.), separating nylon powder through a separator, i.e. obtaining a high-viscosity nylon powder with a relative viscosity of 4-20;

(4) then adding 1-5 parts by weight of a flow agent and 0.1-1 parts by weight of an antioxidant, mixing homogeneously, i.e. obtaining a nylon powder composition with a relative viscosity of 4-20 and the particle sizes in the range of 20-100 micrometers, which can be used for 3D printing.

Said inorganic solid particles are selected from magnetic powder such as iron, nickel, cobalt, and so on, or one or more selected from quartz sand, silica particles and manufactured sand.

Said nylon powder separator is selected from the group consisting of a magnet separator, a suction air separator and a circulating air separator.

In one preferred example of the present invention, it provides thermally conductive high molecular weight nylon composite powder composition, its preparation method and use. The preparation utilizes the principle of anionic polymerization. In the presence of an alkaline catalyst, lactam monomers polymerize on graphite powder to obtain thermally conductive nylon powder. Because it is the in-situ polymerization reaction, graphite is homogeneously dispersed in the nylon matrix. Due to the stronger interfacial interaction between the graphite and the nylon matrix, it is favorable for heat transfer at the interface to reduce the interfacial thermal resistance, and at the same time stress transfer at the interface is utilized, therefore the thermal conductivity of the thermally conductive nylon powder composition is obviously improved. And the strong interface interaction also significantly improves the mechanical properties and thermal stability of the thermally conductive nylon composite material. The thermally conductive nylon powder of the present invention has properties, such as high molecular weight, high thermal conductivity. The nylon molecular weight is adjustable in the range of 0.05-1.2 million, the particle sizes are adjustable in the range of 20-100 micrometers, and the particle size distribution is uniform. The products of the present invention can be used for 3D printing, having good dimensional stability and high thermal conductivity, which can meet the requirements for high-performance and thermally conductive composite materials with complex structures in the fields of thermal energy utilization, chemical heat exchange, and so on. The high molecular weight nylon powder prepared by the method of the present invention is suitable for the 3D printing process.

As described above, the present invention provides a thermally conductive high molecular weight nylon composite powder composition. Said powder composition is obtained via polymerization reaction of the raw materials comprising the following components, based on the weight parts of lactam monomers, wherein:

| | |
|---|---|
| lactam monomer | 100 parts by weight |
| graphite | 1-50 parts by weight |
| alkaline catalyst | 0.005-1 parts by weight |
| activator | 0.01-2 parts by weight |
| antioxidant | 0.1-1 parts by weight |

Said lactam is one or more selected from caprolactam, decanlactam, and dodecanlactam.

Said powder composition is obtained via in-situ melt polymerization after the above-mentioned raw materials are mixed.

The nylon viscosity average molecular weight in said powder is in the range of 0.05-1.2 million. The high molecular weight is good for improving the properties of the product, such as mechanical properties. The particle sizes are in the range of 20-100 micrometers, and the range of the particle sizes is good for the 3D printing process.

Said nylon molecular weight is preferably in the range of 0.1-1 million, or 0.15-0.6 million, 0.25-0.6 million, and also can be 0.35-0.45 million.

The particle sizes of said nylon powder are in the range of 30-90 micrometers, or 40-90 micrometers, and also can be 50-70 micrometers.

Said activator is one or more selected from the group consisting of phenyl 2,4-diisocyanate (TDI), liekena gum, hexamethylene diisocyanate (HDI), methylene diphenyl diisocyanate (MDI), polymethylene polyphenyl polyisocyanate (PAPI), triphenylmethane triisocyanate (JQ-1 glue) and diphenyl carbonate.

Said alkaline catalyst is one or more selected from sodium hydroxide, potassium hydroxide, magnesium hydroxide, sodium ethoxide and sodium methoxide.

Said graphite is one or more selected from flake graphite, expanded graphite, aphanitic graphite and synthetic graphite.

Said graphite particle sizes are in the range of 0.2-50 micrometers, preferably 0.5-30 micrometers, or 1-20 micrometers, and also can be 5-10 micrometers.

The added amount of said graphite is in the range of 5-45 parts by weight, and also can be 10-40 parts by weight, or 20-35 parts by weight.

Said antioxidant is one or more selected from the group consisting of antioxidant 1010: pentaerythritol-tetra-[β-(3,5-di-tert-butyl-4-hydroxyphenyl)-propionate]; antioxidant 1096: IRGANOX B-1096; antioxidant 1098: 3,3'-bis(3,5-di-tert-butyl-4-hydroxyphenyl)-N,N'-hexamethylenedipropionamide in combination with phosphate antioxidant; antioxidant 168: tris (2,4-di-tert-butylphenyl) phosphite. The antioxidant can prevent decomposition of nylon during the 3D printing process at a high temperature.

The added amount of said alkaline catalyst is preferably 0.007-0.8 parts by weight, and also can be 0.05-0.5, 0.1-0.2 parts by weight.

The added amount of said antioxidant is preferably 0.2-0.8 parts by weight, and also can be 0.3-0.5 parts by weight.

The added amount of said activator is preferably 0.1-1.5 parts by weight, 0.2-1 parts by weight and also can be 0.5-0.8 parts by weight.

The present invention also provides the preparation method of the above-described thermally conductive high molecular weight nylon composite powder composition, said method comprising:

(1) based on the weight parts of lactam monomers, adding 100 parts by weight of lactam monomers and 1-50 parts by weight of graphite into a container, and dehydrating under vacuum;

(2) adding 0.005-1 parts by weight of an alkaline catalyst, and 0.1-1 parts by weight of an antioxidant, continuing to vacuum, raising the temperature up to 130-140° C., and keeping the reaction temperature constant for 10-30 minutes;

(3) then, adding 0.01-2 parts by weight of an activator, stirring until mixing homogeneously, pouring into a container containing solid particles preheated to 150-170° C., after vigorously stirring and keeping the temperature constant for a while, cooling to room temperature;

(4) by a separation method, obtaining a nylon powder composition with molecular weights in the range of 0.05-1.2 million and the particle sizes of the thermally conductive nylon composite powder in the range of 20-100 micrometers.

Preferably, said method comprises:

(1) based on the weight parts of lactam monomers, adding 100 parts by weight of lactam monomers and 1-50 parts by weight of graphite into a container, vacuuming at a temperature of 90-120° C. and dehydrating under vacuum;

(2) when a vacuum gauge showing the pressure of the system less than 400 Pa, turning the vacuum off, adding 0.005-1 parts by weight of an alkaline catalyst, and 0.1-1 parts by weight of an antioxidant, continuing to vacuum, raising the temperature up to 130-140° C., when the vacuum gauge showing the pressure of the system less than 400 Pa, keeping the reaction temperature constant for 10-30 minutes;

(3) then, adding 0.01-2 parts by weight of an activator, stirring until mixing homogeneously, pouring into a container containing solid particles preheated to 150-170° C., after vigorously stirring and keeping the temperature constant for 10-30 minutes, naturally cooling to room temperature (e.g. 25-30° C.);

(4) by a separation method, obtaining a thermally conductive nylon composite powder with molecular weights in the range of 0.05-1.2 million and the particle sizes in the range of 20-100 micrometers.

In the above-described method, solid particles are useful for the molecular weight growth process of lactam monomers, in which mutual bonding does not occur in high molecular weight nylon powder. Meanwhile, in the separating step (3), the inorganic solid particles can be sorted out, and the particle recycling can also be realized.

In the above-described method, the particle sizes of said solid particles are in the range of 1-50 micrometers.

Said solid particles are selected from magnetic powder such as iron, nickel, cobalt, and so on, or one or more selected from quartz sand, silica particles and manufactured sand.

In the above-described method, the separator in the step (4) is selected from the group consisting of a magnet separator, a suction air separator and a circulating air separator.

In one preferred example of the present invention, it provides a high molecular weight nylon composite powder composition, its preparation method and use. The preparation utilizes the principle of anionic polymerization. In the presence of an alkaline catalyst, lactam monomers polymerize to obtain nylon powder. The powder prepared by the method can be well used in secondary molding. Compared to the processes of cryogenic grinding and solvent precipitation, the method has advantages, such as low cost, no pollution, and so on. The viscosity molecular weights of the high molecular weight nylon powder are adjustable in the range of 0.05-0.9 million, the particle sizes are adjustable in the range of 20-100 micrometers, and the particle size distribution is uniform. It is a green manufacturing process. The prepared nylon powder is suitable for the 3D printing process.

As described above, the present invention provides a high molecular weight nylon powder composition, which is used for 3D printing. Said powder composition is obtained via polymerization reaction of the raw materials comprising the following components, based on the weight parts of lactam monomers, wherein the raw materials comprise:

| | |
|---|---|
| lactam monomer | 100 parts by weight |
| alkaline catalyst | 0.005-1 parts by weight |
| activator | 0.01-2 parts by weight |
| antioxidant | 0.1-1 parts by weight | said powder composition is obtained via in-situ melt polymerization after the above-mentioned raw materials comprising the following components are mixed.

Said lactam is one or more selected from caprolactam, decanlactam, and dodecanlactam.

Said alkaline catalyst is one or more selected from sodium hydroxide, potassium hydroxide, magnesium hydroxide, sodium ethoxide and sodium methoxide.

Said activator is one or more selected from the group consisting of phenyl 2,4-diisocyanate (TDI), liekena gum, hexamethylene diisocyanate (HDI), methylene diphenyl diisocyanate (MDI), polymethylene polyphenyl polyisocyanate (PAPI), triphenylmethane triisocyanate (JQ-1 glue) and diphenyl carbonate.

Said antioxidant is one or more selected from the group consisting of antioxidant 1010: pentaerythritol-tetra-[β-(3,5-di-tert-butyl-4-hydroxyphenyl)-propionate]; antioxidant 1096: IRGANOX B-1096; antioxidant 1098: 3,3'-bis(3,5-di-tert-butyl-4-hydroxyphenyl)-N,N'-hexamethylenedipropionamide in combination with phosphate antioxidant; antioxidant 168: tris (2,4-di-tert-butylphenyl) phosphite. The antioxidant can prevent decomposition of nylon during the 3D printing process at a high temperature.

The nylon viscosity average molecular weight in said nylon powder composition is in the range of 0.05-0.9 million. The high molecular weight is good for improving the properties of the product, such as mechanical properties. Preferably, said nylon molecular weight is in the range of 0.1-0.8 million, or 0.15-0.7 million, 0.2-0.6 million, and also can be 0.3-0.4 million.

The particle sizes are in the range of 20-100 micrometers, and the range of the particle sizes is beneficial for the 3D printing process. The particle sizes of the nylon powder are preferably in the range of 25-90 micrometers, or 30-80 micrometers, 40-70 micrometers, and also can be 50-60 micrometers.

The added amount of said alkaline catalyst is preferably 0.007-0.8 parts by weigh, and also can be 0.05-0.5, 0.1-0.2 parts by weight.

The added amount of said antioxidant is preferably 0.2-0.8 parts by weigh, and also can be 0.3-0.5 parts by weight.

The added amount of said activator is preferably 0.1-1.5 parts by weigh, 0.2-1 parts by weigh and also can be 0.5-0.8 parts by weight.

The present invention also provides a method for preparing the high molecular weight nylon powder composition for 3D printing, wherein said method comprises the following steps of:

(1) based on the weight parts of lactam monomers, adding 100 parts by weight of lactam monomers into a container, and dehydrating under vacuum;

(2) then adding 0.005-1 parts by weight of an alkaline catalyst, and 0.1-1 parts by weight of an antioxidant, continuing to vacuum, raising the temperature up to 130-140° C.;

(3) after keeping the reaction temperature constant for 10-30 minutes, adding 0.01-2 parts by weight of an activator, stirring until mixing homogeneously;

(4) pouring the mixture obtained after stirring in the step (3) into a container containing solid particles preheated to 150-170° C., after vigorously stirring and keeping the temperature constant for a while, cooling to room temperature;

(5) by a separation method, obtaining a thermally conductive nylon powder composition with molecular weights in the range of 0.05-1.2 million and the particle sizes in the range of 20-100 micrometers.

Said method comprises the following steps of:

(1) based on the weight parts of lactam monomers, adding 100 parts by weight of lactam monomers into a container, vacuuming at a temperature of 90-120° C. and dehydrating under vacuum;

(2) when a vacuum gauge showing the pressure of the system less than 400 Pa, turning the vacuum off, adding 0.005-1 parts by weight of an alkaline catalyst, and 0.1-1 parts by weight of an antioxidant, continuing to vacuum, raising the temperature up to 130-140° C.;

(3) when the vacuum gauge showing the pressure of the system less than 400 Pa, keeping the reaction temperature constant for 10-30 minutes, turning the vacuum off, adding 0.01-2 parts by weight of activator, stirring homogeneously;

(4) pouring the mixture obtained after stirring in the step (3) into a container containing solid particles preheated to 150-170° C., vigorously stirring for 10-30 minutes, naturally cooling to 25° C.;

(5) by a separation method, obtaining a nylon powder composition with molecular weights in the range of 0.05-0.9 million.

In the above-described method, solid particles are useful for molecular weight growth process of lactam monomers, in which mutual bonding does not occur. Meanwhile, in the separating step (5), the solid particles can be sorted out, and the particle recycling can also be realized.

Said solid particles can be reused.

The particle sizes of said solid particles are in the range of 1-50 micrometers.

Said solid particles are selected from magnetic powder such as iron, nickel, cobalt, and so on, or one or more selected from quartz sand, silica particles and manufactured sand.

The separator in the step (5) is selected from the group consisting of a magnet separator, a suction air separator and a circulating air separator.

In one preferred example of the present invention, it provides thermally conductive high-viscosity nylon composite powder composition, its preparation method and use. The preparation utilizes the principle of in-situ polymerization. In the presence of a catalyst, the in-situ polymerization of lactam monomers takes place on graphite powder to obtain nylon powder. The powder prepared by the method has properties, such as high molecular weight, high thermal conductivity. The high-viscosity nylon powder prepared by the method of the present invention is suitable for the 3D printing process.

As described above, the present invention provides a thermally conductive high-viscosity nylon composite powder composition. Said powder composition is obtained via polymerization reaction of the raw materials comprising the following components, based on the weight parts of amide monomers, wherein said raw materials comprise:

| | |
|---|---|
| amide monomer | 100 parts by weight |
| graphite | 1-50 parts by weight |
| catalyst | 0.02-0.8 parts by weight |

-continued

| molecular weight control agent | 5-30 parts by weight |
|---|---|
| molecular chain stabilizer | 0.01-1 parts by weight |
| antioxidant | 0.1-1 parts by weight. |

Said amide is one or more selected from nylon 66, nylon 610, nylon 612.

Said the powder is obtained via in-situ polymerization after the raw materials are mixed.

The relative viscosity of said high-viscosity nylon powder is in the range of 4-20, preferably 5-18, more preferably 6-15, and also can be 8-10.

The particle sizes of said nylon powder are in the range of 20-100 micrometers, and the particle size distribution is beneficial for the 3D printing process. The particle sizes are in the range of 30-90 micrometers, or 40-90 micrometers, and also can be 50-70 micrometers.

Said graphite particle sizes are in the range of 0.2-50 micrometers, preferably 1-40 micrometers, more preferably 5-30 micrometers, and also can be 10-20 micrometers.

Said graphite is one or more selected from flake graphite, expanded graphite, aphanitic graphite and synthetic graphite. Preferably, the added amount of said graphite is in the range of 5-45 parts by weight, and also can be 10-40 parts by weight, or 20-35 parts by weight.

Said molecular weight control agent is one or two selected from adipic acid and dodecanedioic acid. Preferably, the added amount of said molecular weight control agent is in the range of 10-25 parts by weight, more preferably 15-20 parts by weight.

Said molecular chain stabilizer is one or two selected from benzoic acid and acetic acid. Preferably, the added amount of said molecular chain stabilizer is in the range of 0.1-0.8 parts by weight, and also can be 0.3-0.5 parts by weight.

The catalyst is one or two selected from hypophosphorous acid and N-acetylcaprolactam. Preferably, the added amount of said catalyst is 0.1-0.6 parts by weight, and also can be 0.2-0.5 parts by weight.

Said antioxidant is one or more selected from the group consisting of antioxidant 1010: pentaerythritol-tetra-[β-(3, 5-di-tert-butyl-4-hydroxyphenyl)-propionate]; antioxidant 1096: IRGANOX B-1096; antioxidant 1098: 3,3'-bis(3,5-di-tert-butyl-4-hydroxyphenyl)-N,N'-hexamethylenedipropionamide in combination with phosphate antioxidant; antioxidant 168: tris (2,4-di-tert-butylphenyl) phosphite. The antioxidant can prevent decomposition of nylon during the 3D printing process at a high temperature.

Preferably, the added amount of said antioxidant is 0.2-0.8 parts by weight, and also can be 0.3-0.5 parts by weight.

The present invention also provides the preparation method of the thermally conductive high-viscosity nylon composite powder composition, said method comprising the following steps of:

(1) adding 100-600 parts by weight of a high temperature inert solvent into a reactor, during stirring, adding 100 parts by weight of amide, 1-50 parts by weight of graphite and 5-30 parts by weight of a molecular weight control agent, stirring until mixing homogeneously, adding 0.01-1 parts by weight of a molecular chain stabilizer, 0.02-0.8 parts by weight of a catalyst and 0.1-1 part by weight of an antioxidant, stirring until mixing homogeneously;

(2) raising the reactor temperature in at least two steps, firstly uniformly raising the temperature from room temperature to 180-220° C. within a period of time, while maintaining the reactor pressure between 1.5-2 MPa; after that, heating the reactor, raising the temperature from 180-220° C. to 280-285° C. within a period of time, and reducing the reactor pressure to 1.01 MPa; after keeping the temperature between 270-285° C. for 30-60 minutes, vacuuming, reducing the reactor pressure to 0.3 Pa, and maintaining the pressure for 1-4 hours;

(3) opening the discharge valve of the reactor to discharge into the container, vigorously stirring for 10-100 minutes, centrifugally separating, drying, obtaining a thermally conductive nylon composite powder with a relative viscosity of 4-20 and the particle sizes in the range of 20-100 micrometers.

Said method comprises the following steps of:

(1) adding 100-600 parts by weight of a high temperature inert solvent into a reactor, during stirring, adding 100 parts by weight of amide, 1-50 parts by weight of graphite and 5-30 parts by weight of a molecular weight control agent, stirring until mixing homogeneously, adding 0.01-1 parts by weight of a molecular chain stabilizer, 0.02-0.8 parts by weight of a catalyst and 0.1-1 part by weight of an antioxidant, stirring until mixing homogeneously;

(2) purging the reactor with $N_2$ gas and discharging air in the reactor by vacuuming; then purging the reactor with $N_2$ gas to maintain the initial pressure in the reactor between 0.2-0.5 MPa;

(3) uniformly raising the temperature from 25° C. to 180-220° C. within 90-120 minutes, and keeping the temperature for 30-60 minutes, while maintaining the reactor pressure between 1.5-2 MPa; after that, heating the reactor, raising the temperature from 180-220° C. to 280-285° C. within 120-180 minutes, in the meantime, degassing the reactor at a uniform rate, reducing the reactor pressure to 1.01 MPa; after keeping the temperature between 270-285° C. for 30-60 minutes, vacuuming, reducing the reactor pressure to 0.3 Pa, and maintaining the pressure for 1-4 hours;

(4) stop stirring, purging the reactor with $N_2$ gas to increase the pressure inside the reactor from 0.3 Pa to 0.2-0.5 MPa, opening the discharge valve of the reactor to discharge into the container, vigorously stirring for 10-100 minutes, centrifugally separating, drying, obtaining a thermally conductive nylon composite powder with a relative viscosity of 4-20 and the particle sizes in the range of 20-100 micrometers.

The high temperature inert solvent is selected from the group consisting of silicone oil or phenyl silicone oil.

In one preferred example of the present invention, it provides high-viscosity nylon composite powder composition, its preparation method and use. The preparation utilizes the principle of slurry polymerization. The polymerization of amide monomers takes place in solvent. When discharged, it is stirred to form powder. The powder prepared by the method has properties, such as high molecular weight, controllable particle sizes. The high-viscosity nylon powder prepared by the method of the present invention is suitable for the 3D printing process.

As described above, the present invention provides a high-viscosity nylon composite powder composition. Said powder composition is obtained via polymerization reaction of the raw materials comprising the following components, based on the weight parts of amide monomers, wherein said raw materials comprise:

| amide monomer | 100 parts by weight |
|---|---|
| catalyst | 0.02-0.8 parts by weight |

| | |
|---|---|
| molecular weight control agent | 5-30 parts by weight |
| molecular chain stabilizer | 0.01-1 parts by weight |
| antioxidant | 0.1-1 parts by weight. |

Said amide is one or more selected from nylon 66, nylon 610, nylon 612.

Said powder is obtained via slurry polymerization after the raw materials are mixed.

The relative viscosity of said high-viscosity nylon powder is in the range of 4-20, preferably 5-18, more preferably 6-15, and also can be 8-10.

The particle sizes of said nylon powder are in the range of 20-100 micrometers, and the particle size distribution is beneficial for the 3D printing process. The particle sizes are in the range of 30-90 micrometers, or 40-90 micrometers, and also can be 50-70 micrometers.

Said molecular weight control agent is one or two selected from adipic acid and dodecanedioic acid. Preferably, the added amount of said molecular weight control agent is in the range of 10-25 parts by weight, more preferably 15-20 parts by weight.

Said molecular chain stabilizer is one or two selected from benzoic acid and acetic acid. Preferably, the added amount of said molecular chain stabilizer is in the range of 0.1-0.8 parts by weight, and also can be 0.3-0.5 parts by weight.

The catalyst is one or two selected from hypophosphorous acid and N-acetylcaprolactam. Preferably, the added amount of said catalyst is 0.1-0.6 parts by weight, and also can be 0.2-0.5 parts by weight.

Said antioxidant is one or more selected from the group consisting of antioxidant 1010: pentaerythritol-tetra-[β-(3, 5-di-tert-butyl-4-hydroxyphenyl)-propionate]; antioxidant 1096: IRGANOX B-1096; antioxidant 1098: 3,3'-bis(3,5-di-tert-butyl-4-hydroxyphenyl)-N,N'-hexamethylenedipropionamide in combination with phosphate antioxidant; antioxidant 168: tris (2,4-di-tert-butylphenyl) phosphite. The antioxidant can prevent decomposition of nylon during the 3D printing process at a high temperature.

Preferably, the added amount of said antioxidant is 0.2-0.8 parts by weight, and also can be 0.3-0.5 parts by weight.

The present invention also provides a method for preparing the high-viscosity nylon powder composition, wherein said method comprises the following steps of:

(1) adding 100-600 parts by weight of a high temperature inert solvent into a reactor, during stirring, adding 100 parts by weight of amide and 5-30 parts by weight of a molecular weight control agent, stirring until mixing homogeneously, adding 0.01-1 parts by weight of a molecular chain stabilizer, 0.02-0.8 parts by weight of a catalyst and 0.1-1 part by weight of an antioxidant, stirring until mixing homogeneously;

(2) raising the reactor temperature in at least two steps, firstly uniformly raising the temperature from room temperature to 180-220° C. within a period of time, while maintaining the reactor pressure between 1.5-2 MPa; after that, heating the reactor, raising the temperature from 180-220° C. to 280-285° C. within a period of time, and reducing the reactor pressure to 1.01 MPa; after keeping the temperature between 270-285° C. for 30-60 minutes, vacuuming, reducing the reactor pressure to 0.3 Pa, and maintaining the pressure for 1-4 hours;

(3) opening the discharge valve of the reactor to discharge into the container, vigorously stirring for 10-100 minutes, centrifugally separating, drying, obtaining a thermally conductive nylon composite powder with a relative viscosity of 4-20 and the particle sizes in the range of 20-100 micrometers.

Said method comprises the following steps of:

(1) adding 100-600 parts by weight of a high temperature inert solvent into a reactor, during stirring, adding 100 parts by weight of amide and 5-30 parts by weight of a molecular weight control agent, stirring until mixing homogeneously, adding 0.01-1 parts by weight of a molecular chain stabilizer, 0.02-0.5 parts by weight of a catalyst and 0.1-1 part by weight of an antioxidant, stirring until mixing homogeneously;

(2) purging the reactor with $N_2$ gas and discharging air in the reactor by vacuuming; then purging the reactor with $N_2$ gas to maintain the initial pressure in the reactor between 0.2-0.5 MPa;

(3) uniformly raising the temperature from 25° C. to 180-220° C. within 90-120 minutes, and keeping the temperature for 30-60 minutes, while maintaining the reactor pressure between 1.5-2 MPa; after that, heating the reactor, raising the temperature from 180-220° C. to 280-285° C. within 120-180 minutes, in the meantime, degassing the reactor at a uniform rate, reducing the reactor pressure to 1.01 MPa; after keeping the temperature between 270-285° C. for 30-60 minutes, vacuuming, reducing the reactor pressure to 0.3 Pa, and maintaining the pressure for 1-4 hours;

(4) stop stirring, purging the reactor with $N_2$ gas to increase the pressure inside the reactor from 0.3 Pa to 0.2-0.5 MPa, opening the discharge valve of the reactor to discharge into the container, vigorously stirring for 10-100 minutes, centrifugally separating, drying, obtaining a nylon powder composition with a relative viscosity of 4-20 and the particle sizes of the thermally conductive nylon composite powder in the range of 20-100 micrometers.

The high temperature inert solvent is one or more selected from the group consisting of silicone oil or phenyl silicone oil.

The present invention will further be illustrated in detail with reference to the examples, however, the protection scope of the present invention should not be limited to the following examples. Without departing from the above-described scope of the present invention, based on the common technical knowledge and conventional methods in the art, various changes or modifications belong to the scope of the present invention.

In the following examples the "parts" are parts by weight unless otherwise specified.

Comparative Example 1

Using nylon powder with a viscosity of 3 and a particle size of 90 micrometers as a starting material, adding 1 parts by weight of talc with a particle size of 10 nm and 0.1 parts by weight of antioxidant 1010, mixing homogeneously, printing the obtained nylon powder using the following method:

(1) depositing the nylon powder composition onto a carrier surface, and covering a target region;

(2) flatting the nylon powder composition to form a smooth surface;

(3) directing an energy beam over the target region causing said powder to form an integral layer; and (4) repeating the steps (1) to (3) to form additional layers that are integrally bonded to adjacent layers so as to form a three-dimensional product, i.e. giving a 3D printing product, whose mechanical properties of the printing product were shown in Table 1.

Example 1

Using nylon powder with a viscosity of 3 and a particle size of 80 micrometers as raw material, homogeneously mixing 100 parts by weight of nylon 6 powder and 30 parts weight of magnetic powder with a particle sizes of 50 micrometers, such as iron, nickel, cobalt, and so on, adding the mixture into a reactor together, purging the reactor with $N_2$ gas and discharging air in the reactor by vacuuming; then purging the reactor with $N_2$ gas; uniformly raising the reactor temperature from 25° C. up to 180° C. in 90 minutes, and keeping the temperature constant for 10 hours; opening the discharge valve of the reactor to discharge into a container, cooling to a temperature of 25° C., and then separating nylon powder through a magnet separator, i.e. giving high-viscosity nylon 6 powder with a relative viscosity of 20, after that, adding 1 parts by weight of talc with a particle size of 10 nm and 0.1 parts by weight of antioxidant 1010, mixing homogeneously, printing the obtained powder using the same method in COMPARATIVE EXAMPLE 1, whose mechanical properties and test methods were shown in Table 1.

Example 2

Using nylon powder with a viscosity of 3.2 and a particle size of 60 micrometers as a starting material, homogeneously mixing 100 parts by weight of nylon 66 powder and 100 parts weight of magnetic powder a particle size of 10 micrometers, such as iron, nickel, cobalt, and so on, then adding the mixture into a reactor together, purging the reactor with $N_2$ gas and discharging air in the reactor by vacuuming; then purging the reactor with $N_2$ gas; uniformly raising the reactor temperature from 25° C. up to 200° C. in 100 minutes, and keeping the temperature constant for 5 hours; opening the discharge valve of the reactor to discharge into a container, cooling to a temperature of 25° C., and then separating nylon 66 powder through a magnet separator, i.e. giving high-viscosity nylon 66 powder with a relative viscosity of 18, after that, adding 3 parts by weight of silica with a particle size of 20 nm and 0.5 parts by weight of antioxidant 1096, mixing homogeneously, i.e. giving nylon powder with a relative viscosity of 8 and the particle sizes of 80-100 micrometers used for 3D printing, printing the obtained powder using the same method in COMPARATIVE EXAMPLE 1, whose mechanical properties and test methods were shown in Table 1.

Example 3

Using nylon 11 powder with a viscosity of 4 and a particle size of 40 micrometers as a starting material, homogeneously mixing 100 parts by weight of nylon 11 powder and 300 parts weight of quartz sand with a particle size of 1 micrometer, then adding the mixture into a reactor together, purging the reactor with $N_2$ gas and discharging air in the reactor by vacuuming; then purging the reactor with $N_2$ gas; uniformly raising the reactor temperature from 25° C. up to 250° C. in 120 minutes, and keeping the temperature constant for 0.5 hours; opening the discharge valve of the reactor to discharge into a container, cooling to a temperature of 25° C., and then separating nylon 11 powder through a suction air separator, i.e. giving high-viscosity nylon 11 powder with a relative viscosity of 15, after that, adding 5 parts by weight of silica with a particle size of 100 nm and 1 parts by weight of antioxidant 168, mixing homogeneously, i.e. giving nylon powder with a relative viscosity of 15 and the particle sizes of 40-70 micrometers used for 3D printing, printing the obtained powder using the same method in COMPARATIVE EXAMPLE 1, whose mechanical properties and test methods were shown in Table 1.

Example 4

Using nylon 12 powder with a viscosity of 3.5 and a particle size of 30 micrometers as a starting material, homogeneously mixing 100 parts by weight of nylon 12 powder and 200 parts weight of silica particles with a particle size of 10 micrometer, then adding the mixture into a reactor together, purging the reactor with $N_2$ gas and discharging air in the reactor by vacuuming; then purging the reactor with $N_2$ gas; uniformly raising the reactor temperature from 25° C. up to 230° C. in 100 minutes, and keeping the temperature constant for 4 hours; opening the discharge valve of the reactor to discharge into a container, cooling to a temperature of 25° C., and then separating nylon 12 powder through a circulating air separator, i.e. giving high-viscosity nylon 12 powder with a relative viscosity of 12, after that, adding 3 parts by weight of talc with a particle size of 50 nm and 0.8 parts by weight of antioxidant 168, mixing homogeneously, i.e. giving nylon powder with a relative viscosity of 12 and the particle sizes of 30-50 micrometers used for 3D printing, printing the obtained powder using the same method in COMPARATIVE EXAMPLE 1, whose mechanical properties and test methods were shown in Table 1.

Example 5

Using nylon 612 powder with a viscosity of 4 and a particle size of 20 micrometers as a starting material, homogeneously mixing 100 parts by weight of nylon 612 powder and 240 parts weight of manufactured sand particles with a particle size of 30 micrometers, then adding the mixture into a reactor together, purging the reactor with $N_2$ gas and discharging air in the reactor by vacuuming; then purging the reactor with $N_2$ gas; uniformly raising the reactor temperature from 25° C. up to 220° C. in 100 minutes, and keeping the temperature constant for 6 hours; opening the discharge valve of the reactor to discharge into a container, cooling to a temperature of 25° C., and then separating nylon 612 powder through a circulating air separator, i.e. giving high-viscosity nylon 612 powder with a relative viscosity of 10, after that, adding 4 parts by weight of silica with a particle size of 50 nm and 0.5 parts by weight of antioxidant 1010, mixing homogeneously, i.e. giving nylon powder with a relative viscosity of 10 and the particle sizes of 20-40 micrometers used for 3D printing, printing the obtained powder using the same method in COMPARATIVE EXAMPLE 1, whose mechanical properties and test methods were shown in Table 1.

Example 6

Using nylon 610 powder with a viscosity of 3 and a particle size of 15 micrometers as a starting material, homogeneously mixing 100 parts by weight of nylon 610 powder and 150 parts weight of quartz sand particles with a particle size of 40 micrometers, then adding the mixture into a reactor together, purging the reactor with $N_2$ gas and discharging air in the reactor by vacuuming; then purging the reactor with $N_2$ gas; uniformly raising the reactor temperature from 25° C. up to 250° C. in 120 minutes, and keeping the temperature constant for 2 hours; opening the discharge valve of the reactor to discharge into a container, cooling to a temperature of 25° C., and then separating nylon 610 powder through a circulating air separator, i.e. giving high-viscosity nylon 610 powder with a relative viscosity of 4, after that, adding 2 parts by weight of silica with a particle size of 100 nm and 0.3 parts by weight of antioxidant 1096, mixing homogeneously, i.e. giving nylon powder with a relative viscosity of 4 and the particle sizes of 10-30 micrometers used for 3D printing, printing the obtained powder using the same method in COMPARATIVE EXAMPLE 1, whose mechanical properties and test methods were shown in Table 1.

of 5 micrometers into a container, vacuuming at a temperature of 90° C., dehydrating under vacuum, when the vacuum gauge showing the pressure of the system less than 400 Pa, turning the vacuum off, adding 0.005 parts by weight of sodium hydroxide and 0.1 parts by weight of antioxidant 1010, continuing to vacuum, raising the temperature up to 130° C., when the vacuum gauge showing the pressure of the system less than 400 Pa, keeping the reaction temperature constant for 10 minutes, adding 0.01 parts by weight of phenyl 2,4-diisocyanate, stirring homogeneously, pouring into a container containing quartz sand with a particle sizes of 1 micrometer preheated to 160° C., keeping the temperature constant and stirring vigorously for 10 minutes, naturally cooling to 25° C., then separating through a suction air separator, i.e. giving thermally conductive nylon composite

TABLE 1

Performance data and test methods

| | Test method | COMPARATIVE EXAMPLE 1 | EXAMPLE 1 | EXAMPLE 2 | EXAMPLE 3 | EXAMPLE 4 | EXAMPLE 5 | EXAMPLE 6 |
|---|---|---|---|---|---|---|---|---|
| Relative viscosity | GB/T 12005.10-1992 | 3 | 20 | 16 | 15 | 12 | 10 | 4 |
| Powder diameter μm | Laser light scattering | 70-100 | 80-100 | 60-90 | 40-70 | 30-50 | 20-40 | 10-30 |
| Tensile Strength/ MPa | GB/T 1040-1992 | 50-60 | 100-120 | 80-105 | 60-70 | 70-80 | 60-70 | 65-75 |

Comparative Example 2

Based on the weight parts of the caprolactam monomers, adding 100 parts by weight of the caprolactam monomers into a container, vacuuming at a temperature of 90° C., dehydrating under vacuum, when the vacuum gauge showing the pressure of the system less than 400 Pa, turning the vacuum off, adding 0.005 parts by weight of sodium hydroxide, continuing to vacuum, raising the temperature up to 130° C., when the vacuum gauge showing the pressure of the system less than 400 Pa, keeping the reaction temperature constant for 10 minutes, adding 0.06 parts by weight of phenyl 2,4-diisocyanate, stirring homogeneously, pouring into a mold preheated to 170° C., keeping the temperature constant for 30 minutes, naturally cooling to 25° C., then by cryogenic grinding technique, preparing thermally conductive nylon composite powder with the particle sizes of 20-30 micrometers, using the obtained composite powder for 3D printing, the preparation comprising the steps of:

(1) depositing the nylon powder composition onto a carrier surface, and covering a target region;

(2) flatting the nylon powder composition to form a smooth surface;

(3) directing an energy beam over the target region causing said powder to form an integral layer; and (4) repeating the steps (1) to (3) to form additional layers that were integrally bonded to adjacent layers so as to form a three-dimensional product, i.e. giving a 3D printing product, whose mechanical properties were shown in Table 2.

Example 7

Based on the weight parts of the caprolactam monomers, adding 100 parts by weight of the caprolactam monomers and 1 parts by weight of flake graphite with the particle sizes of 5 micrometers into a container, vacuuming at a temperature of 90° C., dehydrating under vacuum, when the vacuum gauge showing the pressure of the system less than 400 Pa, turning the vacuum off, adding 0.005 parts by weight of sodium hydroxide and 0.1 parts by weight of antioxidant 1010, continuing to vacuum, raising the temperature up to 130° C., when the vacuum gauge showing the pressure of the system less than 400 Pa, keeping the reaction temperature constant for 10 minutes, adding 0.01 parts by weight of phenyl 2,4-diisocyanate, stirring homogeneously, pouring into a container containing quartz sand with a particle sizes of 1 micrometer preheated to 160° C., keeping the temperature constant and stirring vigorously for 10 minutes, naturally cooling to 25° C., then separating through a suction air separator, i.e. giving thermally conductive nylon composite powder with a viscosity average molecular weight of 1.2 million and the particle sizes of 20-30 micrometers, using the obtained composite powder for 3D printing, the preparation comprising the steps of:

(1) depositing the nylon powder composition onto a carrier surface, and covering a target region;

(2) flatting the nylon powder composition to form a smooth surface;

(3) directing an energy beam over the target region causing said powder to form an integral layer; and (4) repeating the steps (1) to (3) to form additional layers that were integrally bonded to adjacent layers so as to form a three-dimensional product, i.e. giving a 3D printing product, whose mechanical properties were shown in Table 2.

Example 8

Based on the weight parts of the caprolactam monomers, adding 100 parts by weight of the caprolactam monomers and 10 parts by weight of expanded graphite with a particle size of 0.5 micrometers into a container, vacuuming at a temperature of 100° C., dehydrating under vacuum, when the vacuum gauge showing the pressure of the system less than 400 Pa, turning the vacuum off, adding 0.007 parts by weight of potassium hydroxide and 0.5 parts by weight of antioxidant 1096, continuing to vacuum, raising the temperature up to 135° C., when the vacuum gauge showing the pressure of the system less than 400 Pa, keeping the reaction temperature constant for 10 minutes, adding 0.15 parts by weight of liekena gum, after stirring until mixing homogeneously, pouring into a container containing magnetic powder such as iron, nickel, cobalt with a particle size of 10 micrometers preheated to 165° C., keeping the temperature constant and stirring vigorously for 10 minutes, naturally cooling to 25° C., then separating through a magnet separator, i.e. giving thermally conductive nylon composite powder with a viscosity average molecular weight of 0.6 million and the particle sizes of 30-50 micrometers. The preparation steps of 3D products were the same as those in EXAMPLE 1. The thermal and mechanical properties of 3D printing products were shown in Table 2.

Example 9

Based on the weight parts of the decanlactam monomers, adding 100 parts by weight of the decanlactam monomers and 50 parts by weight of aphanitic graphite with a particle size of 10 micrometers into a container, vacuuming at a temperature of 120° C., dehydrating under vacuum, when the vacuum gauge showing the pressure of the system less than 400 Pa, turning the vacuum off, adding 1 parts by weight of magnesium hydroxide and 1 parts by weight of antioxidant 168, continuing to vacuum, raising the temperature up to 140° C., when the vacuum gauge showing the pressure of the system less than 400 Pa, keeping the reaction temperature constant for 20 minutes, adding 2 parts by weight of hexamethylene diisocyanate, after stirring until mixing homogeneously, pouring into a container containing manufactured sand with a particle size of 20 micrometers preheated to 180° C., keeping the temperature constant and stirring vigorously for 20 minutes, naturally cooling to 25° C., then separating through a circulating air separator, i.e. giving thermally conductive nylon composite powder with a viscosity average molecular weight of 0.45 million and the particle sizes of 40-60 micrometers. The preparation steps of 3D products were the same as those in EXAMPLE 1. The thermal and mechanical properties of 3D printing products were shown in Table 2.

Example 10

Based on the weight parts of the decanlactam monomers, adding 100 parts by weight of the decanlactam monomers and 25 parts by weight of synthetic graphite with a particle size of 1 micrometer into a container, vacuuming at a temperature of 110° C., dehydrating under vacuum, when the vacuum gauge showing the pressure of the system less than 400 Pa, turning the vacuum off, adding 0.1 parts by weight of sodium ethoxide and 0.3 parts by weight of antioxidant 1010, continuing to vacuum, raising the temperature up to 135° C., when the vacuum gauge showing the pressure of the system less than 400 Pa, keeping the reaction temperature constant for 30 minutes, adding 1 parts by weight of methylene diphenyl diisocyanate, after stirring until mixing homogeneously, pouring into a container containing quartz sand with the particle sizes of 15 micrometers preheated to 170° C., keeping the temperature constant and stirring vigorously for 30 minutes, naturally cooling to 25° C., then separating through a circulating air separator, i.e. giving thermally conductive nylon composite powder with a viscosity average molecular weight of 0.35 million and the particle sizes of 50-70 micrometers. The preparation steps of 3D products were the same as those in EXAMPLE 1. The thermal and mechanical properties of 3D printing products were shown in Table 2.

Example 11

Based on the weight parts of the dodecanlactam monomers, adding 100 parts by weight of the dodecanlactam monomers and 30 parts by weight of synthetic graphite with a particle size of 0.2 micrometers into a container, vacuuming at a temperature of 100° C., dehydrating under vacuum, when the vacuum gauge showing the pressure of the system less than 400 Pa, turning the vacuum off, adding 0.05 parts by weight of sodium methoxide and 0.8 parts by weight of antioxidant 1096, continuing to vacuum, raising the temperature up to 135° C., when the vacuum gauge showing the pressure of the system less than 400 Pa, keeping the reaction temperature constant for 15 minutes, adding 0.5 parts by weight of polymethylene polyphenyl polyisocyanate, after stirring until mixing homogeneously, pouring into a container containing silica particles with a particle size of 10 micrometers preheated to 170° C., keeping the temperature constant and stirring vigorously for 20 minutes, naturally cooling to 25° C., then separating through a circulating air separator, i.e. giving thermally conductive nylon composite powder with a viscosity average molecular weight of 0.25 million and the particle sizes of 60-80 micrometers. The preparation steps of 3D products were the same as those in EXAMPLE 1. The thermal and mechanical properties of 3D printing products were shown in Table 2.

Example 12

Based on the weight parts of the dodecanlactam monomers, adding 100 parts by weight of the dodecanlactam monomers and 40 parts by weight of synthetic graphite with a particle size of 30 micrometers into a container, vacuuming at a temperature of 115° C., dehydrating under vacuum, when the vacuum gauge showing the pressure of the system less than 400 Pa, turning the vacuum off, adding 0.5 parts by weight of sodium hydroxide and 0.1 parts by weight of antioxidant 168, continuing to vacuum, raising the temperature up to 130° C., when the vacuum gauge showing the pressure of the system less than 400 Pa, keeping the reaction temperature constant for 30 minutes, adding 0.2 parts by weight of triphenylmethane triisocyanate, after stirring until mixing homogeneously, pouring into a container containing silica particles with a particle size of 20 micrometers preheated to 165° C., keeping the temperature constant and stirring vigorously for 15 minutes, naturally cooling to 25° C., then separating through a circulating air separator, i.e. giving thermally conductive nylon composite powder with a viscosity average molecular weight of 0.15 million and the particle sizes of 70-90 micrometers. The preparation steps of 3D products were the same as those in EXAMPLE 1. The thermal and mechanical properties of 3D printing products were shown in Table 2.

Example 13

Based on the weight parts of the caprolactam monomers, adding 100 parts by weight of the caprolactam monomers and 35 parts by weight of aphanitic graphite with a particle size of 50 micrometers into a container, vacuuming at a temperature of 120° C., dehydrating under vacuum, when the vacuum gauge showing the pressure of the system less than 400 Pa, turning the vacuum off, adding 0.2 parts by weight of sodium hydroxide and 1 parts by weight of antioxidant 1010, continuing to vacuum, raising the temperature up to 140° C. when the vacuum gauge showing the pressure of the system less than 400 Pa, keeping the reaction temperature constant for 20 minutes, adding 0.8 parts by weight of diphenyl carbonate, after stirring until mixing homogeneously, pouring into a container containing magnetic powder such as iron, nickel, cobalt with a particle size of 50 micrometers preheated to 170° C., keeping 170° C. constant and stirring vigorously, naturally cooling to 25° C., then separating through a magnet separator, i.e. giving thermally conductive nylon composite powder with a viscosity average molecular weight of 0.1 million and the particle sizes of 80-100 micrometers. The preparation steps of 3D products were the same as those in EXAMPLE 1. The thermal and mechanical properties of 3D printing products were shown in Table 2.

TABLE 2

Thermal and mechanical properties of 3D printing product

| Test method | The amount of graphite added % | Viscosity average molecular weight (ten thousand) GB/T 12005.10-1992 | Powder diameter μm Laser light scattering | Thermal property Thermal conductivity W/(K·m) GB/T 10294-2008 | Thermal property Heat distortion temperature (° C.) GB/T 1634.2-2004 | Mechanical Property Tensile Strength/ MPa GB/T 1040-1992 |
|---|---|---|---|---|---|---|
| COMPARATIVE EXAMPLE 2 | 0 | 6 | 20-30 | 0.48 | 74.2 | 56 |
| EXAMPLE 7 | 1 | 120 | 20-20 | 0.56 | 118.6 | 60 |
| EXAMPLE 8 | 10 | 60 | 30-50 | 1.06 | 150.7 | 65 |
| EXAMPLE 9 | 50 | 45 | 40-60 | 2.20 | 260.9 | 46 |
| EXAMPLE 10 | 25 | 35 | 50-70 | 1.32 | 190.8 | 54 |
| EXAMPLE 11 | 30 | 25 | 60-80 | 1.41 | 218.6 | 50 |
| EXAMPLE 12 | 40 | 15 | 70-90 | 1.63 | 240.5 | 46 |
| EXAMPLE 13 | 35 | 10 | 80-100 | 1.56 | 230.7 | 42 |

Example 14

Based on the weight parts of the caprolactam monomers, adding 100 parts by weight of the caprolactam monomers into a container, vacuuming at a temperature of 90° C., dehydrating under vacuum, when the vacuum gauge showing the pressure of the system less than 400 Pa, turning the vacuum off, adding 0.005 parts by weight of sodium hydroxide and 0.1 parts by weight of antioxidant 1010, continuing to vacuum, raising the temperature up to 130° C., when the vacuum gauge showing the pressure of the system less than 400 Pa, keeping the reaction temperature constant for 10 minutes, adding 0.01 parts by weight of phenyl 2,4-diisocyanate, stirring until mixing homogeneously, pouring into a container containing quartz sand with a particle sizes of 1 micrometer preheated to 160° C., keeping the temperature constant for 10 minutes, naturally cooling to 25° C., then separating through a suction air separator, obtaining nylon powder with a viscosity average molecular weight of 0.9 million and the particle sizes of 20-30 micrometers, using the obtained powder for 3D printing, the printing method comprising the following steps of:

(1) depositing the nylon powder composition onto a carrier surface, and covering a target region;

(2) flatting the nylon powder composition to form a smooth surface;

(3) directing an energy beam over the target region causing said powder to form an integral layer; and (4) repeating the steps (1) to (3) to form additional layers that were integrally bonded to adjacent layers so as to form a three-dimensional product, i.e. giving a 3D printing product, whose mechanical properties were shown in Table 3.

Example 15

Based on the weight parts of the caprolactam monomers, adding 100 parts by weight of the caprolactam monomers into a container, vacuuming at a temperature of 100° C., dehydrating under vacuum, when the vacuum gauge showing the pressure of the system less than 400 Pa, turning the vacuum off, adding 0.007 parts by weight of potassium hydroxide and 0.5 parts by weight of antioxidant 1096, continuing to vacuum, raising the temperature up to 135° C., when the vacuum gauge showing the pressure of the system less than 400 Pa, keeping the reaction temperature constant for 10 minutes, adding 0.15 parts by weight of liekena gum, after stirring until mixing homogeneously, pouring into a container containing magnetic powder such as iron, nickel, cobalt with a particle size of 10 micrometers preheated to 165° C., keeping the temperature constant and stirring vigorously for 10 minutes, naturally cooling to 25° C., then separating through a magnet separator, i.e. giving nylon powder with a viscosity average molecular weight of 0.5 million and the particle sizes of 20-40 micrometers. The preparation steps of 3D products were the same as those in EXAMPLE 1. The properties of 3D printing products were shown in Table 3.

Example 16

Based on the weight parts of the decanlactam monomers, adding 100 parts by weight of the decanlactam monomers into a container, vacuuming at a temperature of 120° C., dehydrating under vacuum, when the vacuum gauge showing the pressure of the system less than 400 Pa, turning the vacuum off, adding 1 parts by weight of magnesium hydroxide and 1 parts by weight of antioxidant 168, continuing to vacuum, raising the temperature up to 140° C., when the vacuum gauge showing the pressure of the system less than 400 Pa, keeping the reaction temperature constant for 20 minutes, adding 2 parts by weight of hexamethylene diisocyanate, after stirring until mixing homogeneously, pouring into a container containing manufactured sand with a particle size of 20 micrometers preheated to 180° C., keeping the temperature constant and stirring vigorously for 20 minutes, naturally cooling to 25° C., then separating through a circulating air separator, i.e. giving nylon powder with a viscosity average molecular weight of 0.4 million and the particle sizes of 30-50 micrometers. The preparation steps of 3D products were the same as those in EXAMPLE 1. The properties of 3D printing products were shown in Table 3.

Example 17

Based on the weight parts of the decanlactam monomers, adding 100 parts by weight of the decanlactam monomers into a container, vacuuming at a temperature of 110° C., dehydrating under vacuum, when the vacuum gauge showing the pressure of the system less than 400 Pa, turning the vacuum off, adding 0.1 parts by weight of sodium ethoxide and 0.3 parts by weight of antioxidant 1010, continuing to vacuum, raising the temperature up to 135° C., when the vacuum gauge showing the pressure of the system less than 400 Pa, keeping the reaction temperature constant for 30 minutes, adding 1 parts by weight of methylene diphenyl diisocyanate, after stirring until mixing homogeneously, pouring into a container containing quartz sand with a particle size of 15 micrometers preheated to 170° C., keeping the temperature constant and stirring vigorously for 30 minutes, naturally cooling to 25° C., then separating through a circulating air separator, i.e. giving nylon powder with a viscosity average molecular weight of 0.3 million and the particle sizes of 40-60 micrometers. The preparation steps of 3D products were the same as those in EXAMPLE 1. The properties of 3D printing products were shown in Table 3.

Example 18

Based on the weight parts of the dodecanlactam monomers, adding 100 parts by weight of the dodecanlactam monomers into a container, vacuuming at a temperature of 100° C., dehydrating under vacuum, when the vacuum gauge showing the pressure of the system less than 400 Pa, turning the vacuum off, adding 0.05 parts by weight of sodium methoxide and 0.8 parts by weight of antioxidant 1096, continuing to vacuum, raising the temperature up to 135° C., when the vacuum gauge showing the pressure of the system less than 400 Pa, keeping the reaction temperature constant for 15 minutes, adding 0.5 parts by weight of polymethylene polyphenyl polyisocyanate, after stirring until mixing homogeneously, pouring into a container containing silica particles with a particle size of 10 micrometers preheated to 170° C., keeping the temperature constant and stirring vigorously for 20 minutes, naturally cooling to 25° C., then separating through a circulating air separator, i.e. giving nylon powder with a viscosity average molecular weight of 0.3 million and the particle sizes of 50-70 micrometers. The preparation steps of 3D products were the same as those in EXAMPLE 1. The properties of 3D printing products were shown in Table 3.

Example 19

Based on the weight parts of the dodecanlactam monomers, adding 100 parts by weight of the dodecanlactam monomers into a container, vacuuming at a temperature of 115° C., dehydrating under vacuum, when the vacuum gauge showing the pressure of the system less than 400 Pa, turning the vacuum off, adding 0.5 parts by weight of sodium hydroxide and 0.1 parts by weight of antioxidant 168, continuing to vacuum, raising the temperature up to 130° C., when the vacuum gauge showing the pressure of the system less than 400 Pa, keeping the reaction temperature constant for 30 minutes, adding 0.2 parts by weight of triphenylmethane triisocyanate, after stirring until mixing homogeneously, pouring into a container containing silica particles with a particle size of 20 micrometers preheated to 165° C., keeping the temperature constant and stirring vigorously for 15 minutes, naturally cooling to 25° C., then separating through a circulating air separator, i.e. giving nylon powder with a viscosity average molecular weight of 0.15 million and the particle sizes of 60-80 micrometers. The preparation steps of 3D products were the same as those in EXAMPLE 1. The properties of 3D printing products were shown in Table 3.

Example 20

Based on the weight parts of the caprolactam monomers, adding 100 parts by weight of the caprolactam monomers into a container, vacuuming at a temperature of 120° C., dehydrating under vacuum, when the vacuum gauge showing the pressure of the system less than 400 Pa, turning the vacuum off, adding 0.2 parts by weight of sodium hydroxide and 1 parts by weight of antioxidant 1010, continuing to vacuum, raising the temperature up to 140° C., when the vacuum gauge showing the pressure of the system less than 400 Pa, keeping the reaction temperature constant for 20 minutes, adding 0.8 parts by weight of diphenyl carbonate, after stirring until mixing homogeneously, pouring into a container containing magnetic powder such as iron, nickel, cobalt with a particle size of 50 micrometers preheated to 170° C., keeping the temperature of 170° C. constant and stirring vigorously, naturally cooling to 25° C., then separating through a magnet separator, i.e. giving nylon powder with a viscosity average molecular weight of 0.05 million and the particle sizes of 70-100 micrometers. The preparation steps of 3D products were the same as those in EXAMPLE 1. The properties of 3D printing products were shown in Table 3.

TABLE 3

Performance data and test methods

| | Test method | | |
|---|---|---|---|
| | Viscosity average molecular weight GB/T 12005.10-1992 | Powder diameter μm Laser light scattering | Tensile Strength/ MPa GB/T 1040-1992 |
| EXAMPLE 14 | 90 | 20-30 | 80-120 |
| EXAMPLE 15 | 50 | 20-40 | 80-110 |
| EXAMPLE 16 | 40 | 30-50 | 70-95 |
| EXAMPLE 17 | 30 | 40-60 | 60-80 |
| EXAMPLE 18 | 30 | 50-70 | 60-90 |
| EXAMPLE 19 | 15 | 60-80 | 60-80 |
| EXAMPLE 20 | 5 | 70-100 | 50-80 |

Comparative Example 3

Common nylon powder with the particle sizes of 30-50 μm and a relative viscosity of 3 was used for 3D printing, and the process was as follows:
(1) depositing the nylon powder composition onto a carrier surface, and covering a target region;
(2) flatting the nylon powder composition to form a smooth surface;

(3) directing an energy beam over the target region causing said powder to form an integral layer; and (4) repeating the steps (1) to (3) to form additional layers that were integrally bonded to adjacent layers so as to form a three-dimensional product, i.e. giving a 3D printing product, whose mechanical properties were shown in Table 4.

Example 21

Adding 100 parts by weight of high temperature inert solvent silicone oil into a reactor, during stirring, adding 100 parts by weight of nylon 66, 1 parts by weight of flake graphite with a particle size of 0.2 micrometers and 5 parts by weight of adipic acid, after stirring until mixing homogeneously, adding 0.01 parts by weight of benzoic acid, 0.02 parts by weight of hypophosphorous acid and 0.1 parts by weight of antioxidant 1010, stirring until mixing homogeneously; purging the reactor with $N_2$ gas and discharging air in the reactor by vacuuming; then purging the reactor with $N_2$ gas to maintain the initial pressure in the reactor between 0.2-0.5 MPa; uniformly raising the reactor temperature from 25° C. to 180-190° C. in 90 minutes, keeping the temperature for 30 minutes, while maintaining the reactor pressure between 1.5-2 MPa; after that, heating the reactor, raising the temperature from 180-190° C. to 280-285° C. in 180 minutes, in the meantime, degassing the reactor at a uniform rate, reducing the reactor pressure to 1.01 MPa; after keeping the temperature of 270° C. for 30 minutes, vacuuming, reducing the reactor pressure to 0.3 Pa, and maintaining the pressure for 1 hours; stop stirring, purging the reactor with $N_2$ gas to increase the pressure inside the reactor from 0.3 Pa to 0.2-0.5 MPa, opening the discharge valve of the reactor to discharge into the container, vigorously stirring for 10 minutes, centrifugally separating, drying, obtaining the thermally conductive nylon composite powder with a relative viscosity of 20 and the particle sizes in the range of 80-100 micrometers.

Using above-described nylon powder for 3D printing, the process as follows:

(1) depositing the nylon powder composition onto a carrier surface, and covering a target region;

(2) flatting the nylon powder composition to form a smooth surface;

(3) directing an energy beam over the target region causing said powder to form an integral layer; and (4) repeating the steps (1) to (3) to form additional layers that were integrally bonded to adjacent layers so as to form a three-dimensional product, i.e. giving a 3D printing product, whose thermal and mechanical properties were shown in Table 4.

Example 22

Adding 100 parts by weight of high temperature inert solvent phenyl silicone oil into a reactor, during stirring, adding 100 parts by weight of nylon 610, 10 parts by weight of expanded graphite with a particle size of 5 micrometers and 10 parts by weight of dodecanedioic acid, after stirring until mixing homogeneously, adding 0.1 parts by weight of acetic acid, 0.1 parts by weight of N-acetylcaprolactam and 0.5 parts by weight of antioxidant 1096, stirring until mixing homogeneously; purging the reactor with $N_2$ gas and discharging air in the reactor by vacuuming; then purging the reactor with $N_2$ gas to maintain the initial pressure in the reactor between 0.2-0.5 MPa; uniformly raising the reactor temperature from 25° C. to 190-200° C. in 100 minutes, keeping the temperature for 40 minutes, while maintaining the reactor pressure between 1.5-2 MPa; after that, heating the reactor, raising the temperature from 190-200° C. to 280-285° C. in 140 minutes, in the meantime, degassing the reactor at a uniform rate, reducing the reactor pressure to 1.01 MPa; after keeping the temperature of 280° C. for 40 minutes, vacuuming, reducing the reactor pressure to 0.3 Pa, and maintaining the pressure for 2 hours; stop stirring, purging the reactor with $N_2$ gas to increase the pressure inside the reactor from 0.3 Pa to 0.2-0.5 MPa, opening the discharge valve of the reactor to discharge into the container, vigorously stirring for 30 minutes, centrifugally separating, drying, obtaining the thermally conductive nylon composite powder with a relative viscosity of 15 and the particle sizes in the range of 60-80 micrometers. The preparation method of 3D products was the same as those in EXAMPLE 1. The thermal and mechanical properties of 3D printing products were shown in Table 4.

Example 23

Adding 600 parts by weight of high temperature inert solvent silicone oil into a reactor, during stirring, adding 100 parts by weight of nylon 612, 50 parts by weight of aphanitic graphite with a particle size of 50 micrometers and 30 parts by weight of adipic acid, after stirring until mixing homogeneously, adding 1 parts by weight of benzoic acid, 0.5 parts by weight of hypophosphorous acid and 1 parts by weight of antioxidant 168, stirring until mixing homogeneously; purging the reactor with $N_2$ gas and discharging air in the reactor by vacuuming; then purging the reactor with $N_2$ gas to maintain the initial pressure in the reactor between 0.2-0.5 MPa; uniformly raising the reactor temperature from 25° C. to 210-220° C. in 120 minutes, keeping the temperature for 60 minutes, while maintaining the reactor pressure between 1.5-2 MPa; after that, heating the reactor, raising the temperature from 210-220° C. to 280-285° C. in 120 minutes, in the meantime, degassing the reactor at a uniform rate, reducing the reactor pressure to 1.01 MPa; after keeping the temperature of 285° C. for 60 minutes, vacuuming, reducing the reactor pressure to 0.3 Pa, and maintaining the pressure for 4 hours; stop stirring, purging the reactor with $N_2$ gas to increase the pressure inside the reactor from 0.3 Pa to 0.2-0.5 MPa, opening the discharge valve of the reactor to discharge into the container, vigorously stirring for 100 minutes, centrifugally separating, drying, obtaining the thermally conductive nylon composite powder with a relative viscosity of 10 and the particle sizes in the range of 50-70 micrometers. The preparation method of 3D products was the same as that in EXAMPLE 1. The thermal and mechanical properties of 3D printing products were shown in Table 4.

Example 24

Adding 300 parts by weight of high temperature inert solvent phenyl silicone oil into a reactor, during stirring, adding 100 parts by weight of nylon 66, 15 parts by weight of synthetic graphite with a particle size of 10 micrometers and 15 parts by weight of dodecanedioic acid, after stirring until mixing homogeneously, adding 0.5 parts by weight of acetic acid, 0.8 parts by weight of N-acetylcaprolactam and 0.8 parts by weight of antioxidant 1096, stirring until mixing homogeneously; purging the reactor with $N_2$ gas and discharging air in the reactor by vacuuming; then purging the reactor with $N_2$ gas to maintain the initial pressure in the reactor between 0.2-0.5 MPa; uniformly raising the reactor temperature from 25° C. to 200-210° C. in 110 minutes, keeping the temperature for 50 minutes, while maintaining the reactor pressure between 1.5-2 MPa; after that, heating the reactor, raising the temperature from 200-210° C. to 280-285° C. in 130 minutes, in the meantime, degassing the reactor at a uniform rate, reducing the reactor pressure to 1.01 MPa; after keeping the temperature of 280° C. for 50 minutes, vacuuming, reducing the reactor pressure to 0.3 Pa, and maintaining the pressure for 3 hours; stop stirring, purging the reactor with $N_2$ gas to increase the pressure inside the reactor from 0.3 Pa to 0.2-0.5 MPa, opening the discharge valve of the reactor to discharge into the container, vigorously stirring for 30 minutes, centrifugally separating, drying, obtaining the thermally conductive nylon composite powder with a relative viscosity of 4 and the particle sizes in the range of 20-40 micrometers. The preparation method of 3D products was the same as those in EXAMPLE 1. The thermal and mechanical properties of 3D printing products were shown in Table 4.

vacuuming; then purging the reactor with $N_2$ gas to maintain the initial pressure in the reactor between 0.2-0.5 MPa; uniformly raising the reactor temperature from 25° C. to 180-190° C. in 90 minutes, keeping the temperature for 30 minutes, while maintaining the reactor pressure between 1.5-2 MPa; after that, heating the reactor, raising the temperature from 180-190° C. to 280-285° C. in 180 minutes, in the meantime, degassing the reactor at a uniform rate, reducing the reactor pressure to 1.01 MPa; after keeping the temperature of 270° C. for 30 minutes, vacuuming, reducing the reactor pressure to 0.3 Pa, and maintaining the pressure for 1 hours; stop stirring, purging the reactor with $N_2$ gas to increase the pressure inside the reactor from 0.3 Pa to 0.2-0.5 MPa, opening the discharge valve of the reactor to discharge into the container, vigorously stirring for 10 minutes, centrifugally separating, drying, obtaining the thermally conductive nylon composite powder with a relative viscosity of 20 and the particle sizes in the range of 80-100

TABLE 4

| | Performance data and test methods | | | | | |
|---|---|---|---|---|---|---|
| | | | | Thermal | Mechanical Property | |
| Test method | The amount of graphite added % | Relative viscosity GB/T 12005.10-1992 | Powder diameter μm Laser light scattering | property Thermal conductivity W/(K · m) GB/T 10294-2008 | Heat distortion temperature (° C.) GB/T 1634.2-2004 | Tensile Strength/ MPa GB/T 1040-1992 |
| COMPARATIVE EXAMPLE 3 | 0 | 3 | 30-50 | 0.4 | 74.2 | 60 |
| EXAMPLE 21 | 1 | 20 | 80-100 | 0.56 | 118.6 | 80-110 |
| EXAMPLE 22 | 10 | 15 | 60-80 | 0.81 | 150.3 | 70-100 |
| EXAMPLE 23 | 50 | 10 | 50-70 | 2.20 | 260.9 | 70-95 |
| EXAMPLE 24 | 15 | 4 | 20-40 | 1.23 | 190.8 | 60-80 |

Comparative Example 4

Common nylon powder with the particle sizes of 30-50 μm and a relative viscosity of 3 was used for 3D printing, and the process was as follows:

(1) depositing the nylon powder composition onto a carrier surface, and covering a target region;

(2) flatting the nylon powder composition to form a smooth surface;

(3) directing an energy beam over the target region causing said powder to form an integral layer; and (4) repeating the steps (1) to (3) to form additional layers that were integrally bonded to adjacent layers so as to form a three-dimensional product, i.e. giving a 3D printing product, whose mechanical properties were shown in Table 5.

Example 25

Adding 100 parts by weight of high temperature inert solvent silicone oil into a reactor, during stirring, adding 100 parts by weight of nylon 66 and 5 parts by weight of adipic acid, after stirring until mixing homogeneously, adding 0.01 parts by weight of benzoic acid, 0.02 parts by weight of hypophosphorous acid and 0.1 parts by weight of antioxidant 1010, stirring until mixing homogeneously; purging the reactor with $N_2$ gas and discharging air in the reactor by vacuuming; then purging the reactor with $N_2$ gas to maintain the initial pressure in the reactor between 0.2-0.5 micrometers, using the obtained nylon powder for 3D printing to prepare products, its process comprising the steps of:

(1) depositing the nylon powder composition onto a carrier surface, and covering a target region;

(2) flatting the nylon powder composition to form a smooth surface;

(3) directing an energy beam over the target region causing said powder to form an integral layer; and (4) repeating the steps (1) to (3) to form additional layers that were integrally bonded to adjacent layers so as to form a three-dimensional product, i.e. giving a 3D printing product, whose thermal and mechanical properties were shown in Table 5.

Example 26

Adding 100 parts by weight of high temperature inert solvent phenyl silicone oil into a reactor, during stirring, adding 100 parts by weight of nylon 610, 10 parts by weight of dodecanedioic acid, after stirring until mixing homogeneously, adding 0.1 parts by weight of acetic acid, 0.1 parts by weight of N-acetylcaprolactam and 0.5 parts by weight of antioxidant 1096, stirring until mixing homogeneously; purging the reactor with $N_2$ gas and discharging air in the reactor by vacuuming; then purging the reactor with $N_2$ gas to maintain the initial pressure in the reactor between 0.2-0.5

MPa; uniformly raising the reactor temperature from 25° C. to 190-200° C. in 100 minutes, keeping the temperature for 40 minutes, while maintaining the reactor pressure between 1.5-2 MPa; after that, heating the reactor, raising the temperature from 190-200° C. to 280-285° C. in 140 minutes, in the meantime, degassing the reactor at a uniform rate, reducing the reactor pressure to 1.01 MPa; after keeping the temperature of 280° C. for 40 minutes, vacuuming, reducing the reactor pressure to 0.3 Pa, and maintaining the pressure for 2 hours; stop stirring, purging the reactor with N$_2$ gas to increase the pressure inside the reactor from 0.3 Pa to 0.2-0.5 MPa, opening the discharge valve of the reactor to discharge into the container, vigorously stirring for 30 minutes, centrifugally separating, drying, obtaining the thermally conductive nylon composite powder with a relative viscosity of 18 and the particle sizes in the range of 60-80 micrometers. The preparation method of 3D products was the same as those in EXAMPLE 1. The thermal and mechanical properties of 3D printing products were shown in Table 5.

Example 27

Adding 600 parts by weight of high temperature inert solvent silicone oil into a reactor, during stirring, adding 100 parts by weight of nylon 612, and 30 parts by weight of adipic acid, after stirring until mixing homogeneously, adding 1 parts by weight of benzoic acid, 0.5 parts by weight of hypophosphorous acid and 1 parts by weight of antioxidant 168, stirring until mixing homogeneously; purging the reactor with N$_2$ gas and discharging air in the reactor by vacuuming; then purging the reactor with N$_2$ gas to maintain the initial pressure in the reactor between 0.2-0.5 MPa; uniformly raising the reactor temperature from 25° C. to 210-220° C. in 120 minutes, keeping the temperature for 60 minutes, while maintaining the reactor pressure between 1.5-2 MPa; after that, heating the reactor, raising the temperature from 210-220° C. to 280-285° C. in 120 minutes, in the meantime, degassing the reactor at a uniform rate, reducing the reactor pressure to 1.01 MPa; after keeping the temperature of 285° C. for 60 minutes, vacuuming, reducing the reactor pressure to 0.3 Pa, and maintaining the pressure for 4 hours; stop stirring, purging the reactor with N$_2$ gas to increase the pressure inside the reactor from 0.3 Pa to 0.2-0.5 MPa, opening the discharge valve of the reactor to discharge into the container, vigorously stirring for 100 minutes, centrifugally separating, drying, obtaining the thermally conductive nylon composite powder with a relative viscosity of 16 and the particle sizes in the range of 50-70 micrometers. The preparation method of 3D products was the same as that in EXAMPLE 1. The thermal and mechanical properties of 3D printing products were shown in Table 5.

Example 28

Adding 300 parts by weight of high temperature inert solvent phenyl silicone oil into a reactor, during stirring, adding 100 parts by weight of nylon 66, and 15 parts by weight of dodecanedioic acid, after stirring until mixing homogeneously, adding 0.5 parts by weight of acetic acid, 0.8 parts by weight of N-acetylcaprolactam and 0.8 parts by weight of antioxidant 1096, stirring until mixing homogeneously; purging the reactor with N$_2$ gas and discharging air in the reactor by vacuuming; then purging the reactor with N$_2$ gas to maintain the initial pressure in the reactor between 0.2-0.5 MPa; uniformly raising the reactor temperature from 25° C. to 200-210° C. in 110 minutes, keeping the temperature for 50 minutes, while maintaining the reactor pressure between 1.5-2 MPa; after that, heating the reactor, raising the temperature from 200-210° C. to 280-285° C. in 130 minutes, in the meantime, degassing the reactor at a uniform rate, reducing the reactor pressure to 1.01 MPa; after keeping the temperature of 280° C. for 50 minutes, vacuuming, reducing the reactor pressure to 0.3 Pa, and maintaining the pressure for 3 hours; stop stirring, purging the reactor with N$_2$ gas to increase the pressure inside the reactor from 0.3 Pa to 0.2-0.5 MPa, opening the discharge valve of the reactor to discharge into the container, vigorously stirring for 30 minutes, centrifugally separating, drying, obtaining the thermally conductive nylon composite powder with a relative viscosity of 4 and the particle sizes in the range of 20-40 micrometers. The preparation method of 3D products was the same as those in EXAMPLE 1. The thermal and mechanical properties of 3D printing products were shown in Table 5.

TABLE 5

Performance test results

| | Test method | | |
|---|---|---|---|
| | Relative viscosity GB/T 12005.10-1992 | Powder diameter μm Laser light scattering | Tensile Strength/ MPa GB/T 1040-1992 |
| COMPARATIVE EXAMPLE 4 | 3 | 50 | 60 |
| EXAMPLE 25 | 20 | 80-100 | 80-110 |
| EXAMPLE 26 | 18 | 60-80 | 90-105 |
| EXAMPLE 27 | 16 | 50-70 | 70-99 |
| EXAMPLE 28 | 4 | 20-40 | 60-76 |

The invention claimed is:
1. A method for preparing a composition for 3D printing, comprising:
   mixing 100 parts by weight of a first nylon powder and 30-300 parts by weight of inorganic particles to form a reactant mixture, wherein the inorganic particles are selected from cobalt, silica, and mixtures thereof and moderately low first nylon powder has a relative viscosity of 3-4;
   maintaining a temperature of the reactant mixture at 180-250° C. for 0.5-10 hours;
   separating the reactant mixture to obtain the inorganic particles and a second nylon powder having a relative viscosity of 4-20; and
   mixing 100 parts by weight of the second nylon powder with 1-5 parts by weight of a flow agent and 0.1-1 parts by weight of an antioxidant to obtain the composition for 3D printing.
2. The method according to claim 1, wherein the flow agent is selected from hydrated silicas, amorphous alumina, glassy silicas, glassy phosphates, glassy borates, titanium dioxides, talc, mica, fumed silicas, kaolin, attapulgite, calcium silicates, magnesium silicates, magnesium silica, and mixtures thereof, and
   wherein the antioxidant is selected from pentaerythritol-tetra-[β-(3,5-di-tert-butyl-4-hydroxyphenyl)-propionate], 3,3'-bis(3,5-di-tert-butyl-4-hydroxyphenyl)-N,N'-hexamethylenedipropionamide in combination with phosphate antioxidant, tris (2,4-di-tert-butylphenyl) phosphite, and mixtures thereof.

3. The method according to claim 1, wherein the molecular weight of the second nylon powder is in a range of 0.25-0.6 million.

4. The method according to claim 3, wherein the molecular weight of the second nylon powder is in the range of 0.35-0.45 million.

5. The method according to claim 1, further comprising raising the temperature of the reactant mixture to 180-250° C. in 90-120 minutes.

* * * * *